US012160795B2

(12) United States Patent
Johnson et al.

(10) Patent No.: US 12,160,795 B2
(45) Date of Patent: *Dec. 3, 2024

(54) EVACUATION TRACKING

(71) Applicant: United States Postal Service, Washington, DC (US)

(72) Inventors: Jeffrey C. Johnson, Annapolis, MD (US); Leonetta J. Jackson, Dublin, CA (US); Srinivasa R. Chappidi, Cupertino, CA (US); Dongni S. Growney, Belmont, CA (US); Bijai T. Nidhiri, Fremont, CA (US); Danny Tan, San Francisco, CA (US); Jini J. Thokalath, Foster City, CA (US); Gang Yin, Fremont, CA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,791

(22) Filed: Sep. 1, 2023

(65) Prior Publication Data

US 2023/0421997 A1 Dec. 28, 2023

Related U.S. Application Data

(63) Continuation of application No. 17/737,613, filed on May 5, 2022, now Pat. No. 11,778,424, which is a (Continued)

(51) Int. Cl.
*H04W 24/00* (2009.01)
*H04W 4/021* (2018.01)
(Continued)

(52) U.S. Cl.
CPC .......... *H04W 4/029* (2018.02); *H04W 4/021* (2013.01); *H04W 4/12* (2013.01); *H04W 4/90* (2018.02); *H04W 12/06* (2013.01)

(58) Field of Classification Search
CPC ....... H04W 4/029; H04W 4/021; H04W 4/12; H04W 4/90; H04W 12/06; H04L 63/083
(Continued)

(56) References Cited

U.S. PATENT DOCUMENTS 9,980,112 B1 * 5/2018 Newby ................. H04W 4/021
2020/0178035 A1 6/2020 Johnson et al.
(Continued)

*Primary Examiner* — Marcos Batista
(74) *Attorney, Agent, or Firm* — MH2 Technology Law Group, LLP

(57) ABSTRACT

Techniques for tracking an evacuation of a location in an environment that utilizes physical tokens to prove physical presence at the location are presented. The techniques include receiving data representing of subordinates of an evacuation facilitator; receiving physical token based location status information for at least one of the subordinates, where the physical token based location status information is based on electronic readings of the physical tokens; determining based on the physical token based location status information, a physical presence status at the location for the at least one of the subordinates; receiving evacuation status information for each of the at least one of the subordinates that has a physical presence status that indicates a presence at the location; and recording the evacuation status information for each of the at least one of the subordinates that has a physical presence status that indicates a presence at the location.

20 Claims, 11 Drawing Sheets

Related U.S. Application Data continuation of application No. 17/064,275, filed on Oct. 6, 2020, now Pat. No. 11,368,814, which is a continuation of application No. 16/699,922, filed on Dec. 2, 2019, now Pat. No. 10,841,748.

(60) Provisional application No. 62/774,417, filed on Dec. 3, 2018.

(51) Int. Cl.
*H04W 4/029* (2018.01)
*H04W 4/12* (2009.01)
*H04W 4/90* (2018.01)
*H04W 12/06* (2021.01)

(58) Field of Classification Search
USPC .............................. 455/356.1–456.3; 370/338
See application file for complete search history.

(56) References Cited

U.S. PATENT DOCUMENTS

| | | |
|---|---|---|
| 2021/0037345 A1 | 2/2021 | Johnson et al. |
| 2022/0264256 A1 | 4/2022 | Johnson et al. |

* cited by examiner

FIG. 3 eMVAC Check List

Select Manager: Leonetta J Jackson

*Please check in the employees that are present*

| Direct Reports | Badged Out | Checked In | Not Present |
|---|---|---|---|
| 8 | 4 | 1 | 3 |

Total Counts

| | | | |
|---|---|---|---|
| 43 | 10 | 0 | 33 |

Save

| Employee Name | Badge Status | Present |
|---|---|---|
| 1 + Carolin X Lee | In | ◯ |
| 2 + Cheryl Lee | Out | |
| 3 + Judy Wong | In | ◯ |
| 4 + Leonard Timossi | In | ◯ |
| 5 + Mike L 10143940 | Out | |
| 6 + Srinivasa R Chappidi | Out | |
| 7 - Visitor - Jane A Lewis | Out | |
| 8 - Visitor - Juno W Lane | In | ◯ |

FIG. 9

EVACUATION TRACKING

CROSS-REFERENCE TO RELATED APPLICATIONS

This application is a continuation of U.S. Utility patent application Ser. No. 17/737,613, entitled "Evacuation Tracking," filed May 5, 2022, which is a continuation of U.S. Utility patent application Ser. No. 17/064,275, entitled "Evacuation Tracking," filed Oct. 6, 2020, which is a continuation of U.S. Utility patent application Ser. No. 16/699,922, entitled "Evacuation Tracking," filed Dec. 2, 2019, which claims priority to, and the benefit of, U.S. Provisional Patent Application No. 62/774,417, entitled, "Evacuation Tracking," filed Dec. 3, 2018, all of which are hereby incorporated by reference in their entireties.

FIELD

This disclosure relates generally to devices and systems for evacuations and simulated emergencies (e.g., evacuation drills), and more particularly to improved devices and systems for detecting individual evacuees.

BACKGROUND

Emergencies, such as by way of non-limiting examples, fires, earthquakes, and active shooters, may prompt evacuations from locations. In general, such evacuations may be accomplished by having one or more evacuation facilitators (e.g., managers in a workplace environment) generate lists of individuals (e.g., employees) that the evacuation facilitators have judged to be safe, or check off the evacuees that they see from pre-printed lists of all the employees for which they are responsible. However, accounting for individuals during a location evacuation using such lists has a number of drawbacks. For example, the evacuation facilitators must rely on their memory as to which employees they are charged with accounting for. Although the evacuees charged to a particular evacuation facilitator may be well-known to the evacuation facilitator, e.g., their coworkers or subordinates, in the fog of an actual emergency, some may be left unaccounted for. Further, multiple evacuation facilitators have no reasonable way to share their evacuation information amongst themselves. Because evacuation locations may be very large, e.g., corporate campuses covering many acres, the evacuation facilitators cannot rely on physical proximity to share evacuation information, and evacuees may be accounted for multiple times, or missed altogether. Yet further, existing techniques do not alert interested individuals, e.g., executive team contacts, automatically upon initialization of an evacuation event. These and other shortcomings of existing techniques may be overcome by embodiments as described in detail herein.

SUMMARY

According to various embodiments, a computer implemented method of tracking an evacuation of a location in an environment that utilizes physical tokens to prove physical presence at the location is presented. The method includes: receiving wirelessly, by an application executing on a mobile device of an evacuation facilitator, data representing a plurality of subordinates of the evacuation facilitator; receiving wirelessly, by the application executing on the mobile device of the evacuation facilitator, physical token based location status information for at least one of the plurality of subordinates of the evacuation facilitator, where the physical token based location status information is based on electronic readings of the physical tokens; determining based on the physical token based location status information, a physical presence status at the location for the at least one of the plurality of subordinates; receiving, by the application executing on the mobile device of the evacuation facilitator, evacuation status information for each of the at least one of the plurality of subordinates that has a physical presence status that indicates a presence at the location; and recording in remote persistent memory the evacuation status information for each of the at least one of the plurality of subordinates that has a physical presence status that indicates a presence at the location.

Various optional features of the above embodiments include the following. The receiving evacuation status information may include receiving electronic proximity information, by the application executing on the mobile device of the evacuation facilitator, of an electronic device of at least one of the at least one of the plurality of subordinates that has a physical presence status that indicates a presence at the location. The receiving evacuation status information may include capturing an image, by the application executing on the mobile device of the evacuation facilitator, of at least one of the at least one of the plurality of subordinates that has a physical presence status that indicates a presence at the location. The receiving evacuation status information may include recording a voiceprint, by the application executing on the mobile device of the evacuation facilitator, of at least one of the at least one of the plurality of subordinates that has a physical presence status that indicates a presence at the location. The receiving evacuation status information may include receiving a textual message, by the application executing on the mobile device of the evacuation facilitator, from at least one of the at least one of the plurality of subordinates that has a physical presence status that indicates a presence at the location. The receiving evacuation status information may include receiving data from the evacuation facilitator, by the application executing on the mobile device of the evacuation facilitator, regarding the at least one of the at least one person of the plurality of subordinates that has a physical presence status that indicates a presence at the location. The method may further include receiving from the evacuation facilitator, and by the application executing on the mobile device of the evacuation facilitator, a selection of a manager subordinate to the evacuation facilitator, where the plurality of subordinates include at least subordinates to the manager subordinate to the evacuation facilitator. The method may further include displaying, by a second mobile device of a second evacuation facilitator executing a copy of the application, at least evacuation status information for each of the plurality of subordinates who is a subordinate to the second evacuation facilitator. The method may further include displaying, by the application executing on the mobile device of the evacuation facilitator, at least the evacuation status information for each of the at least one of the plurality of subordinates that has a physical presence status that indicates a presence at the location. The method may further include displaying, by the application executing on the mobile device of the evacuation facilitator, evacuation status information for subordinates of subordinates of the evacuation facilitator.

According to various embodiments, computer readable media including instructions that, when executed by at least one electronic processor, configure the at least one electronic processor to track an evacuation of a location, in an environment that utilizes physical tokens to prove physical presence at the location, by performing the following operations, are presented. The operations include: receiving wirelessly, by an application executing on a mobile device of an evacuation facilitator, data representing a plurality of subordinates of the evacuation facilitator; receiving wirelessly, by the application executing on the mobile device of the evacuation facilitator, physical token based location status information for at least one of the plurality of subordinates of the evacuation facilitator, where the physical token based location status information is based on electronic readings of the physical tokens; determining based on the physical token based location status information, a physical presence status at the location for the at least one of the plurality of subordinates; receiving, by the application executing on the mobile device of the evacuation facilitator, evacuation status information for each of the at least one of the plurality of subordinates that has a physical presence status that indicates a presence at the location; and recording in remote persistent memory the evacuation status information for each of the at least one of the plurality of subordinates that has a physical presence status that indicates a presence at the location.

Various optional features of the above embodiments include the following. The receiving evacuation status information may include receiving electronic proximity information, by the application executing on the mobile device of the evacuation facilitator, of an electronic device of at least one of the at least one of the plurality of subordinates that has a physical presence status that indicates a presence at the location. The receiving evacuation status information may include capturing an image, by the application executing on the mobile device of the evacuation facilitator, of at least one of the at least one of the plurality of subordinates that has a physical presence status that indicates a presence at the location. The receiving evacuation status information may include recording a voiceprint, by the application executing on the mobile device of the evacuation facilitator, of at least one of the at least one of the plurality of subordinates that has a physical presence status that indicates a presence at the location. The receiving evacuation status information may include receiving a textual message, by the application executing on the mobile device of the evacuation facilitator, from at least one of the at least one of the plurality of subordinates that has a physical presence status that indicates a presence at the location. The receiving evacuation status information may include receiving data from the evacuation facilitator, by the application executing on the mobile device of the evacuation facilitator, regarding the at least one of the at least one person of the plurality of subordinates that has a physical presence status that indicates a presence at the location. The operations may further include receiving from the evacuation facilitator, and by the application executing on the mobile device of the evacuation facilitator, a selection of a manager subordinate to the evacuation facilitator, where the plurality of subordinates include at least subordinates to the manager subordinate to the evacuation facilitator. The operations may further include displaying, by a second mobile device of a second evacuation facilitator executing a copy of the application, at least evacuation status information for each of the plurality of subordinates who is a subordinate to the second evacuation facilitator. The operations may further include displaying, by the application executing on the mobile device of the evacuation facilitator, at least the evacuation status information for each of the at least one of the plurality of subordinates that has a physical presence status that indicates a presence at the location. The operations may further include displaying, by the application executing on the mobile device of the evacuation facilitator, evacuation status information for subordinates of subordinates of the evacuation facilitator.

BRIEF DESCRIPTION OF THE DRAWINGS

Various features of the examples can be more fully appreciated, as the examples become better understood with reference to the following detailed description, when considered in connection with the accompanying figures, in which:

FIG. 3 depicts a screenshot of a physical token tracking database interface according to various embodiments;

FIG. 9 depicts a rollup view checklist of an evacuation tracking application executing on a mobile device according to various embodiments;

DESCRIPTION

Figure 1:
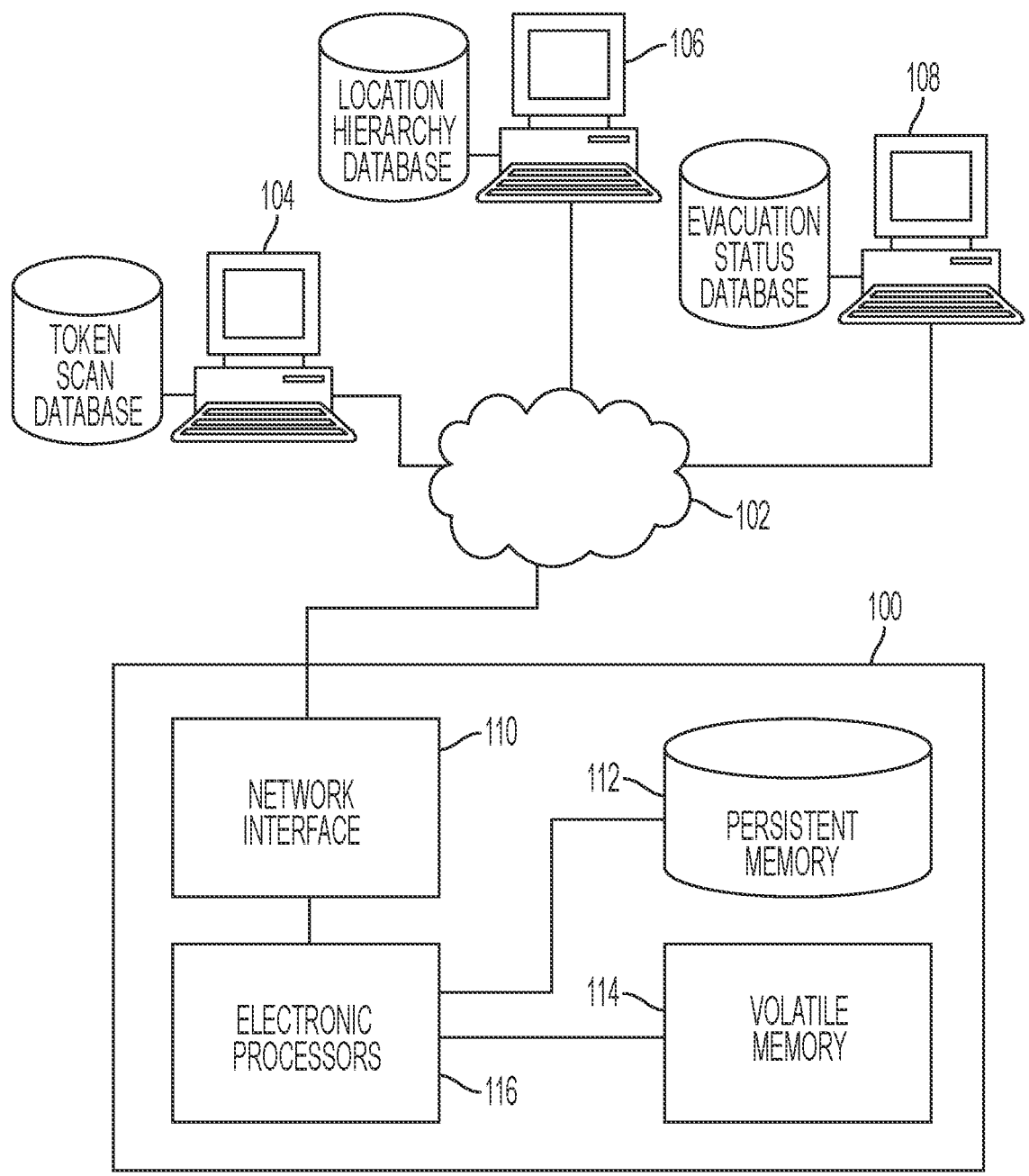
FIG. 1 is a schematic diagram of a system for evacuation tracking according to various embodiments.

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Many locations, such as places of employment (e.g., office buildings, office floors, office suites, cubicle farms, corporate campuses, job sites, factories, etc.), utilize physical tokens for tracking individuals. Each physical token may be in the form of a badge or other physical implement, which is held by a respective individual. The physical token may have the individual's name and other information printed on its face. Each physical token may store computer-readable data that encodes the individual's information, such as the individual's name and/or identification number relevant to the location. The computer-readable data may be encoded in a barcode (e.g., QR code) on the physical token, stored in a Radio Frequency Identification (RFID) chip embedded in the physical token, or present on or in the physical token in any other computer readable form. When an individual enters or exits the location, he or she scans his or her physical token using a scanning device appropriate for the particular physical tokens (e.g., an RFID reader, a barcode scanner, etc.). Thus, scanning devices may be present at entrances and exits of the location. The scanning devices obtain the individual's information, such as name and/or identification number, from the physical token. The scanning devices may be networked to a remote database, referred to herein as a "token scan database", which tracks individuals' presence relative to the location. Thus, each scan event causes the respective scanner to send a scan data set, including at least the individual's data, to the token scan database. The token scan database may associate the individual's data and scan event with a timestamp, which may be provided by the scanning device as part of the scan data set, or, alternately, by the token scan database itself. More particularly, the token scan database may maintain a record, or records, for each tracked individual and update the record(s) in real time to represent whether the individual is currently present at, or absent from, the location according to the individual's past scans. Employers, for example, may utilize such records, including the timestamps, to ensure that employees are appropriately located during work hours.

Some embodiments utilize an application installed and/or executing on mobile devices such as smart phones to track evacuations during emergency simulations or real emergencies. The application, when executed, allows evacuation facilitators to obtain a headcount of evacuees. Evacuation facilitators may account for individuals using the application via a variety of techniques and technologies according to various embodiments, including, for example, electronic proximity detection of individuals' mobile devices, photographic identification, voiceprint, evacuation facilitator attestation, and/or textual message within the application. According to some embodiments, the application automatically determines which individuals are present at the location according to their physical token scan history, and are thus subject to the evacuation. It automatically excludes individuals whose physical token scan history indicates that they are absent from the location. Further, the application may be installed on multiple devices of multiple evacuation facilitators, and may be used to share, and obtain, real time evacuation status information among evacuation facilitators. Some embodiments permit an evacuation facilitator to view evacuation status information for a subordinate evacuation facilitator. Some embodiments permit the designation of evacuation facilitators before or during an actual emergency or emergency simulation. These and other technical features and advantages are described in detail herein.

FIG. 1 is a schematic diagram of a system for evacuation tracking according to various embodiments. The system includes a mobile device 100, which may be a smart phone, tablet, personal digital assistant, or other electronic mobile device capable of obtaining and executing an application as disclosed herein, and capable of accomplishing the various wireless and direct communications and actions of the application, as described herein. Thus, mobile device 100 includes one or more electronic processors 116, which are communicatively coupled to volatile memory 114 and persistent memory 112. Persistent memory 112 may store computer executable instructions comprising the application disclosed herein according to various embodiments. Mobile device 100 also includes network interface 110, which may be a wireless network interface, communicatively coupling mobile device 100 to a cellular data network, a Wi-Fi network, or another wireless network. As shown in FIG. 1, network 102 may include multiple networks, such as a wireless network communicatively coupled to wireless device 100, together with the internet, for example.

According to some embodiments, the application is obtained and installed on mobile device 100 by downloading it from an application distribution site, for example. According to some embodiments, the application is a web application, available by navigating a browser of mobile device 100 to a web page. According to such embodiments, the web page itself may execute the application.

According to various embodiments, mobile device 100 has communication channels via network 102 to one or more remote databases 104, 106, 108. As depicted in FIG. 1, each remote database 104, 106, 108 is identified with both its electronic computer readable data store and its server computer. The communication channels may be via a wireless network and/or the internet, according to some embodiments.

In particular, mobile device is communicatively coupled to token scan database 104, which records in real time data representing whether the individual is currently present at or absent from the location according to the individual's past scans of their physical token. Mobile device is also communicatively coupled to location hierarchy database 106, which stores data representing the hierarchy of individuals at the location at issue. Such a hierarchy may be an employee hierarchy, representing supervisory and subordinate relationships between individuals. Mobile device 100 is also communicatively coupled to evacuation status database 108, which receives, stores, and disburses evacuations status information from mobile device 100 and other mobile devices that have a copy of the application installed and executing thereon. Databases 104, 106, 108 and their functionalities are further described herein.

Figure 2:
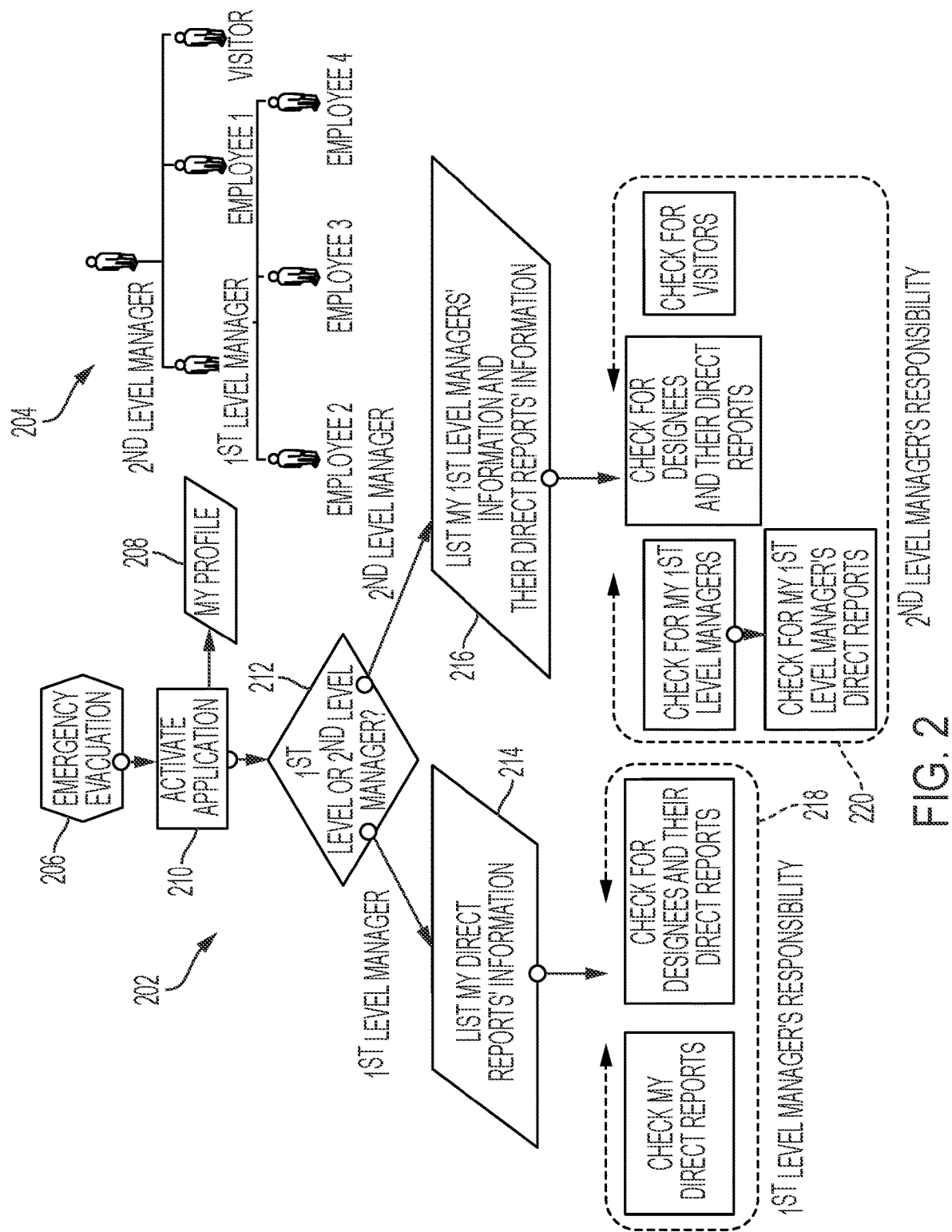
FIG. 2 is a hybrid diagram of a process for evacuation tracking according to various embodiments.

FIG. 2 is a hybrid diagram 202 of a process for evacuation tracking according to various embodiments. Diagram 202 depicts how embodiments may utilize a hierarchy associated with the location to facilitate an evacuation using an application executing on mobile devices of evacuation facilitators. Such a hierarchy may be an employment hierarchy, e.g., as represented by an organization chart for the location.

Thus, FIG. 2 depicts an example employment hierarchy 204, including a second level manager, who supervises a first level manager. Also shown are individual employees both directly under the second level manager and under one of the first level managers. A visitor is depicted as being directly under the second level manager. Note that some embodiments classify visitors to the location as reporting directly to the highest level supervisor in the hierarchy for purposes of facilitating the evacuation as described further herein. A computer readable electronic representation of hierarchy 204 (or other hierarchy) may be stored in location hierarchy database 106, e.g., in the form of a connected directed acyclic graph.

Diagram 202 of FIG. 2 depicts a portion of an evacuation process according to some embodiments. The process may begin with the declaration of an emergency evacuation 206. The declaration may be outside of the application, e.g., announced on an intercom, sent via email, or indicated by the activation of an evacuation alarm. An evacuation facilitator, for example, a first or second-level manager, may activate 210 the application on their mobile device. The mobile device, executing the application, retrieves the evacuation facilitator's profile 208 from location hierarchy database 106. The profile includes or represents a portion of the hierarchy 204 that is under the evacuation facilitator. This information is used to determine the individuals that the particular evacuation facilitator is charged with accounting for. Next at 212, the application determines the hierarchal level of the evacuation facilitator based on the retrieved profile. Depending on the level within the hierarchy 204 of the evacuation facilitator, the application displays information representing the individuals that are under the evacuation facilitator in the hierarchy. For example, if the evacuation facilitator is a first-level manager, the application lists 214 the individuals that directly report to the evacuation facilitator. If the evacuation facilitator is a second-level manager, the application lists 216 the individual employees that directly report to the evacuation facilitator, the first-level managers that report to the evacuation facilitator, and the individual employees that report to the first-level managers that report to the evacuation facilitator. According to some embodiments, the application also lists 216 any visitors for second level manager evacuation facilitators. Note that visitors may be assigned a temporary physical token, such as a badge displaying their name and a photograph, which may be tracked together with the permanent physical tokens in the same token scan database. Responsibilities 218 of first-level managers may include accounting for individuals that directly report to each first-level manager in their role as an evacuation facilitator, as well as accounting for any specially designated (e.g., substitute) evacuation facilitators and their direct reports according to various embodiments. Responsibilities 220 of second-level managers may include accounting for individuals that directly report to each second-level manager in their role as an evacuation facilitator, accounting for any specially designated evacuation facilitators and their direct reports, accounting for any first-level managers and their direct reports under the evacuation facilitator in the hierarchy, and accounting for any visitors according to various embodiments. The displaying and the manner of accounting is described further herein.

Note that some embodiments permit managers to specially designate (e.g., substitute) evacuation facilitators when the standard evacuation facilitators are absent or unavailable. Such embodiments may temporarily alter records in the location hierarchy database 106 to replace the record for a standard evacuation facilitator with that of a substitute evacuation facilitator.

After the emergency (or emergency simulation) is complete, the evacuation facilitator may activate a "reset" button in the application. Such a button may clear all of the evacuation status information present in the evacuation status database 106. The reset may change an indicator of individuals in the system to "not present" and also may signal completion of the event, either "emergency" or "emergency simulation".

Figure 3:
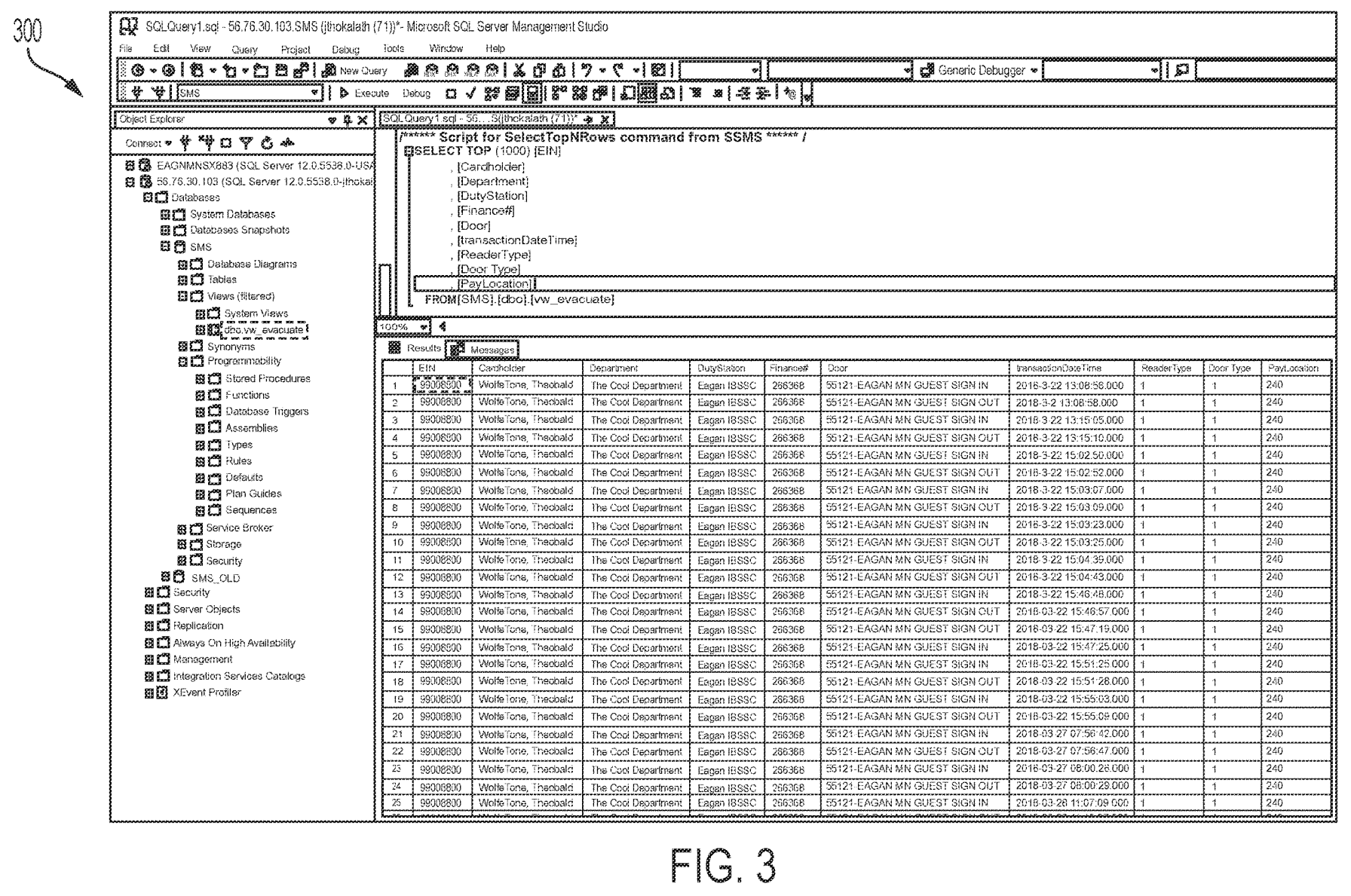

FIG. 3 depicts a screenshot of a token scan database interface 300 according to various embodiments. The token scan database interface 300 may be used with the token scan database 104 of FIG. 4, for example. As shown, the token scan database interface 300 lists records for the individual "Theobald WolfeTone," including data representing individual scan events, their timestamps, and their locations (i.e., the locations of the relevant scanning devices). The token scan database interface 300 further displays the identification number for Mr. WolfeTone, his duty station, and his department. The token scan database interface 300 may accompany an Application Program Interface (API), enabling communications between a copy of the application executing on a mobile device 100 and the token scan database interface 300.

Figure 4:
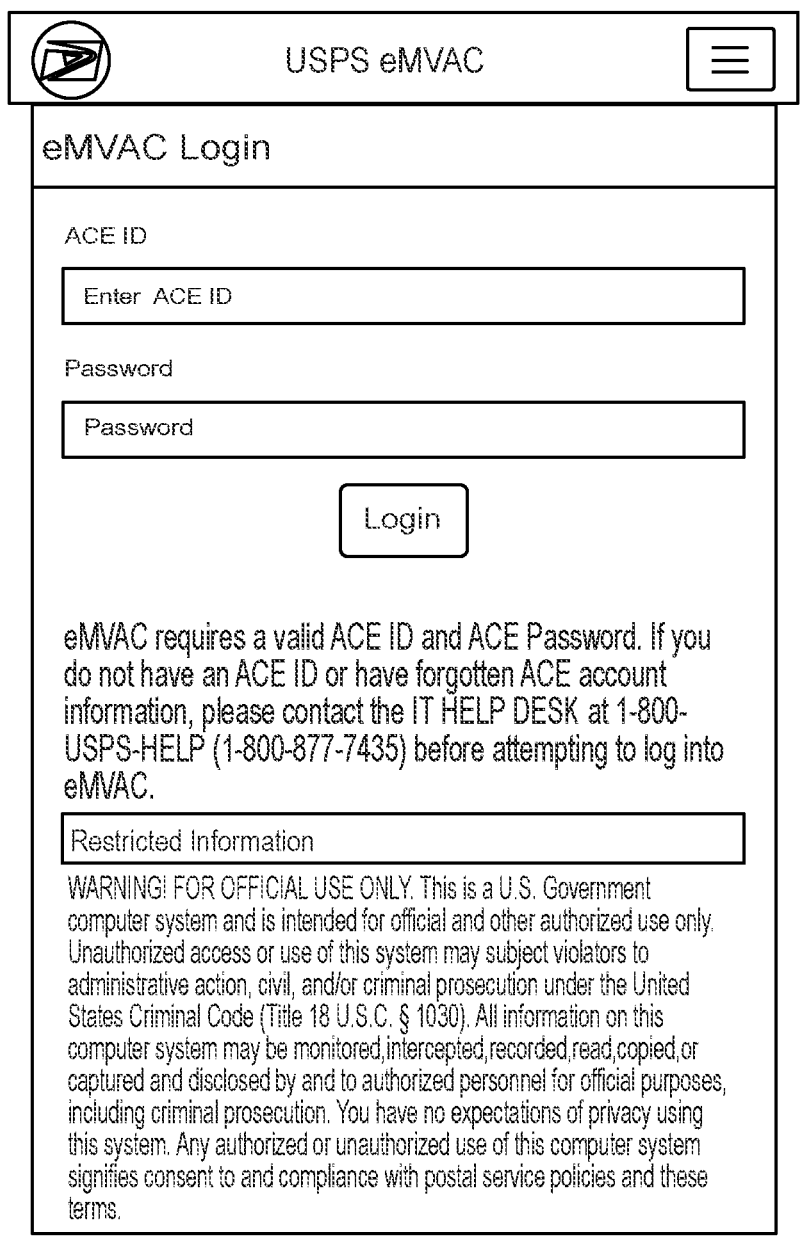
FIG. 4 depicts a login screen of an evacuation tracking application executing on a mobile device according to various embodiments.

FIG. 4 depicts an example of a login screen 400 for an evacuation tracking application executing on a mobile device 100 according to various embodiments. The login screen 400 depicts fields for an evacuation facilitator to enter their identification and password. The identification may be a user name, or may be an employee number, e.g., as stored in the location hierarchy database 106. The login screen 400 may be the first screen presented to an evacuation facilitator upon activating the application on their mobile device according to some embodiments.

Figure 5:
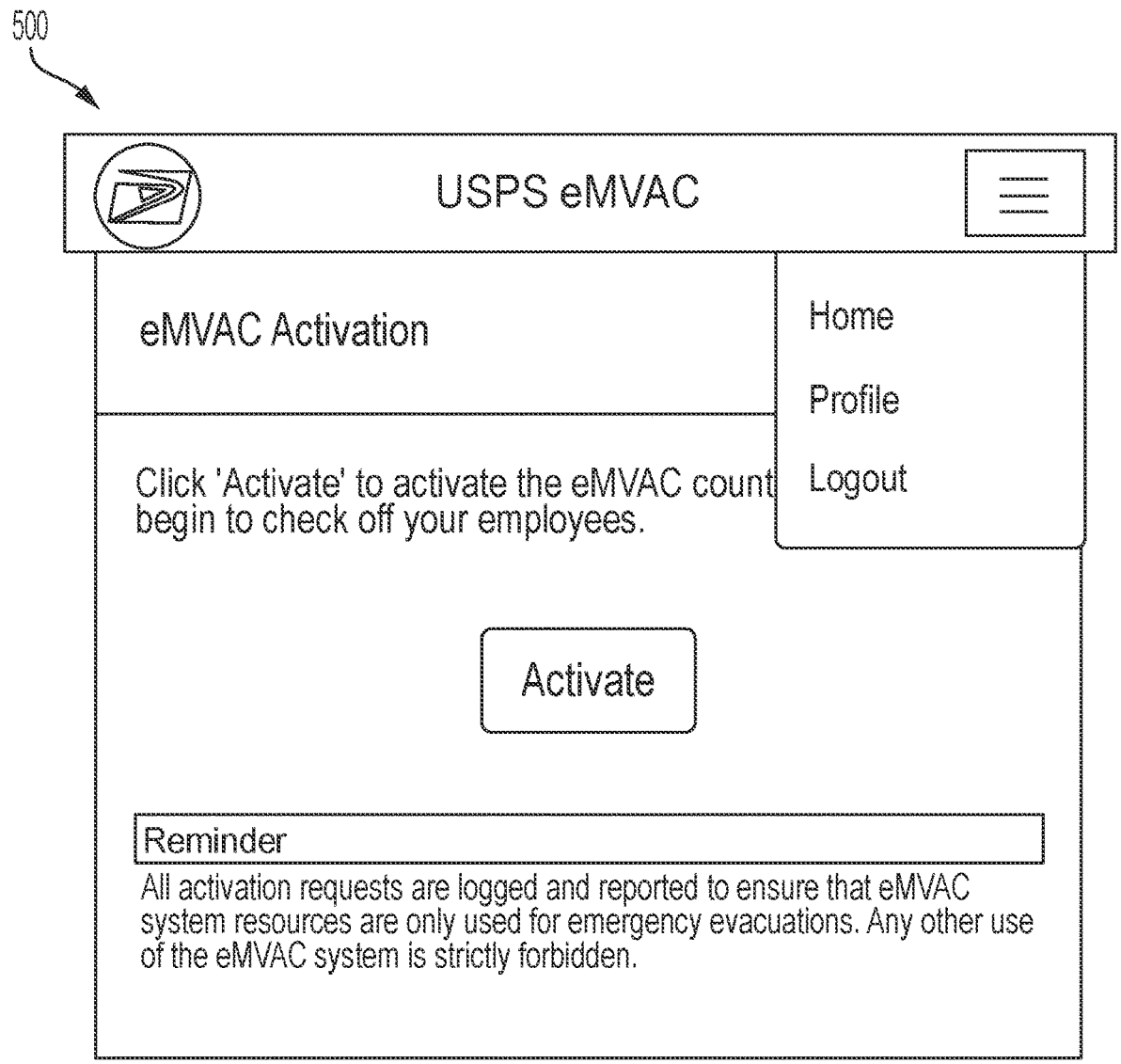
FIG. 5 depicts an activation screen of an evacuation tracking application executing on a mobile device according to various embodiments.

FIG. 5 depicts an example of an activation screen 500 for an evacuation tracking application executing on a mobile device 100 according to various embodiments. The activation screen 500 includes a button or other input expedient labeled "activate". Upon an evacuation facilitator activating the button, the application may display an option selection screen, as shown and described in reference to FIG. 6.

Figure 6:
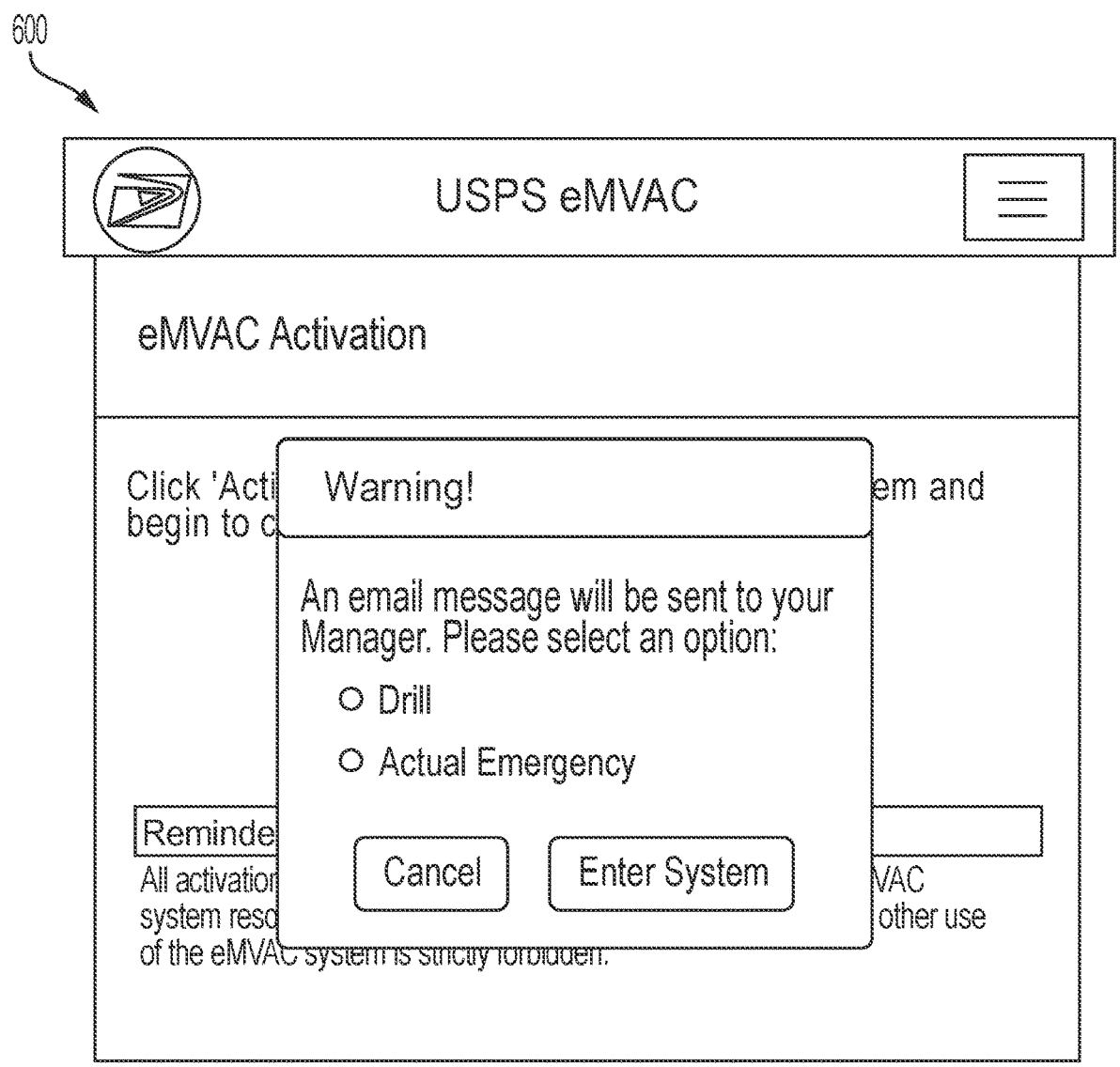
FIG. 6 depicts an option screen of an evacuation tracking application executing on a mobile device according to various embodiments.

FIG. 6 depicts an option screen 600 of an evacuation tracking application executing on a mobile device 100 according to various embodiments. As depicted by the option screen 600 shown, the application displays a warning message that the application will send an email message if the evacuation facilitator chooses to proceed. The email message may be sent to any of a variety of individuals. According to various embodiments, the email message is sent to the evacuation facilitator's immediate supervisor, one or more designated emergency individual(s), such as a CEO or risk management officer, or any combination of such individuals. The application may identify these individuals by retrieving data from the location hierarchy database 106. The warning message displayed by the application also includes input functionality that allows the evacuation facilitator to specify whether the evacuation is for an actual emergency or an emergency simulation. That is, the warning message permits the evacuation facilitator to indicate a selection from among the choices of "actual emergency" and "emergency simulation".

Figure 7:
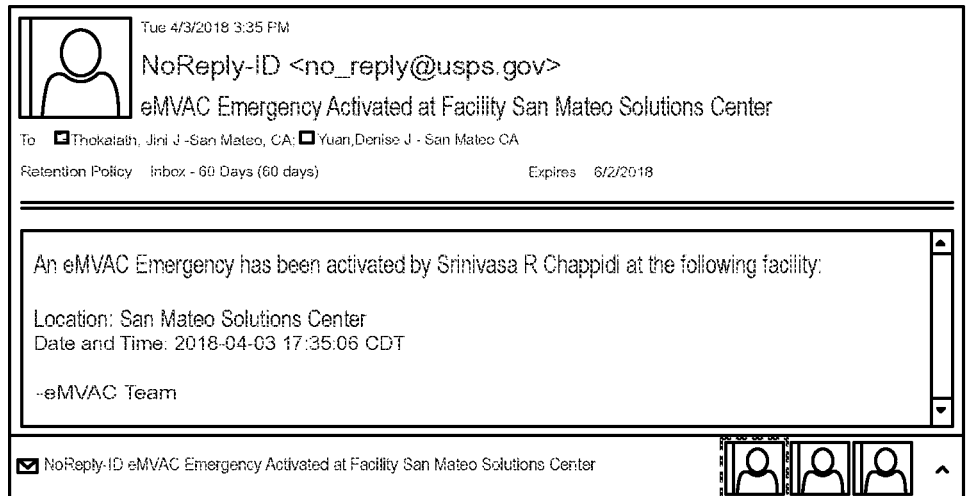
FIG. 7 depicts two example notification emails according to various embodiments.
Figure 7:
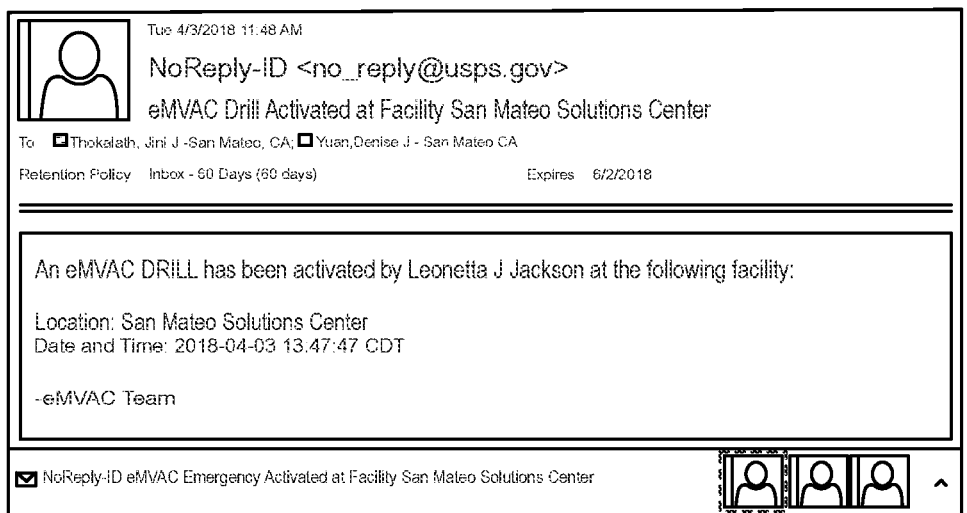

FIG. 7 depicts two examples of notification emails 702, 704 according to various embodiments. Both notification emails 702, 704 represent examples sent to immediate supervisors of the evacuation facilitator that activates the evacuation on the application, e.g., via the interface shown in FIG. 5. The notification email 702 indicates that an actual emergency has been activated, and the notification email 704 indicates that an emergency simulation has been activated. Both notification emails 702, 704 include relevant information, such as the identity of the location at which the evacuation is occurring.

Figure 8:
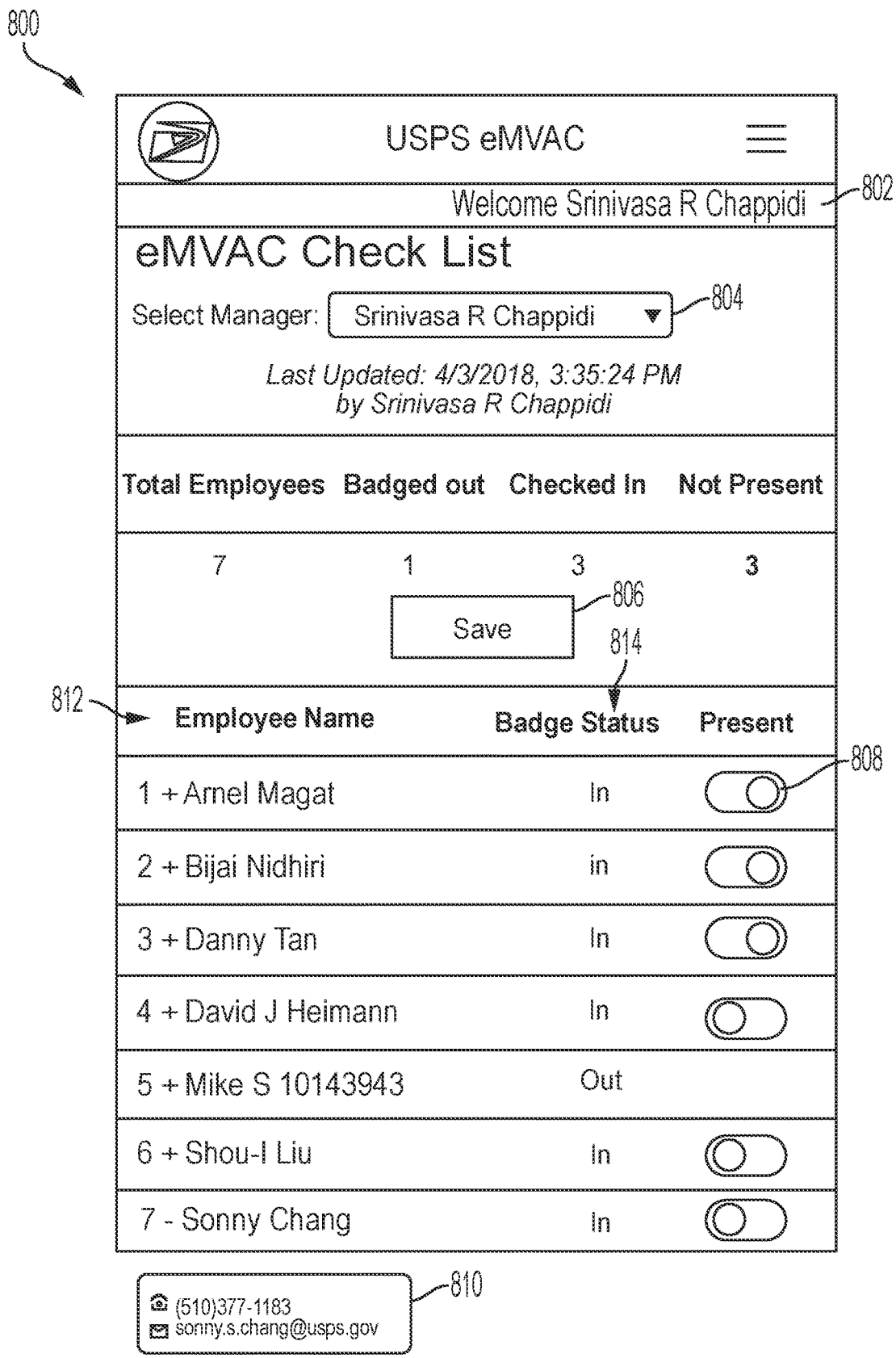
FIG. 8 depicts a checklist screen of an evacuation tracking application executing on a mobile device according to various embodiments.

FIG. 8 depicts an example of a checklist screen 800 for an evacuation tracking application executing on a mobile device 100 according to various embodiments. As shown, the application displays the name 802 of the evacuation facilitator who is logged in to the application. Further, the application provides a selection interface or mechanism 804, in the depicted embodiment a dropdown menu, to select an evacuation facilitator view. The name selected by the selection mechanism 804 determines the individuals displayed by the application in the checklist screen 800 under the name heading 812. In particular, the displayed individuals under the name heading 812 correspond to the subordinates of the selected evacuation facilitator according to the records of the location hierarchy database 106. The subordinate information may be obtained, for example, using tree traversal techniques applied to the hierarchy tree 204 stored in the location hierarchy database 106. The evacuation facilitator may expand the information 810 about any particular subordinate, which causes the application to retrieve data regarding the individual, such as phone number, email address, physical station at the location, and/or disability status from the location hierarch database 106, and display it on the screen of the evacuation facilitator's mobile device 100. By default, the selection mechanism or interface 804 may be set to the name 802 of the evacuation facilitator that is logged in. As shown in FIG. 8, the selected view is that of the logged in evacuation facilitator. However, the evacuation facilitator may select the name of any subordinate evacuation facilitator using selection mechanism 804, according to some embodiments, to display a view from the perspective of the selected evacuation facilitator.

The checklist screen 800 depicts elements for tracking, detecting or accounting for individuals during an emergency or emergency simulation. Thus, for each individual whose name appears under the name heading 812, the checklist screen displays a corresponding status under the status heading 814 as that status is currently represented in the token scan database 104. For individuals whose status according to the token scan database 104 records is "in" the location, the application displays selectors or indicators 808. For individuals whose status according to the token scan database 104 records is "out" of the location, the application may omit the selectors or indicators 808 for those individuals because they were not located in the location when the emergency or emergency simulation was activated. According to the illustrated embodiment of the checklist screen 800, the evacuation facilitator may attest to an individual's evacuation status by setting a respective selector 808 to indicate "present" or "not present". The evacuation facilitator may attest that an individual evacuee is present and manipulate a selector 808 accordingly, by way of non-limiting example, upon confirming visually that a respective individual has evacuated the location (e.g., has left the building) and/or is present at a designated checkpoint away from the location. However, other embodiments may employ other techniques for automatically determining the presence of an evacuee and setting the evacuation status of the individuals listed under the name heading 812. Some examples are disclosed presently.

Some embodiments use electronic proximity detection techniques to determine the presence or evacuation status of the individuals listed under the name heading 812. According to such embodiments, the individuals may register their mobile electronic devices with the system ahead of time. The registration may include receiving, from the individuals, identifying data regarding short-distance network (e.g., BLUETOOTH) parameters for their mobile devices, and storing such data or parameters in the location hierarchy database 106, for example. During an evacuation event, the mobile device of the evacuation facilitator may detect the proximity of the individuals' mobile devices using the short-distance network. According to some embodiments, it may do so by acting as a BLUETOOTH beacon, connecting with the mobile devices, determining their short-distance network parameters, matching them to the parameters stored at the location hierarchy database 106, for example, and setting a respective indicator 808 on the checklist screen from "not present" to "present". According to some embodiments, the application may display a confirmation request to the evacuation facilitator prior to setting a respective indicator 808. For example, the application may display a pop-up box with text, "Do you want to check in Theobald WolfeTone based on device proximity?" along with corresponding buttons for accepting or rejecting such check-in.

Some embodiments use facial recognition techniques to determine the presence or evacuation status of the individuals listed under the name heading 812. According to such embodiments, individuals may register facial recognition data with the system ahead of time. The registration may include receiving, from the individuals, one or more images of their faces, and storing corresponding facial recognition data in the location hierarchy database 106, for example. During an evacuation event, the evacuation facilitator may capture one or more images of the individuals that have safely evacuated using a camera of the mobile device 100. The application extracts one or more faces from the images, and matches the extracted faces to facial recognition data stored at the location hierarchy database 106, for example, and appropriately setting a respective selector or indicator 808 on the checklist screen 800. According to some embodiments, the application may display a confirmation request and accept/reject buttons to the evacuation facilitator, and set a respective indicator 808 accordingly.

Some embodiments use speaker or voice identification techniques to determine the presence or evacuation status of the individuals listed under the name heading 812. According to such embodiments, individuals may register voiceprint identification data with the system ahead of time. The registration may include receiving a sample of their voice from an individual, e.g., saying a specified phrase, and storing corresponding voice identification data in the location hierarchy database 106, for example. During an evacuation event, the evacuation facilitator may capture audio of individuals that have safely evacuated using a microphone of the mobile device 100. The application extracts one or more voiceprints from the audio, and matches the extracted voiceprint(s) to voiceprint identification data stored at the location hierarchy database 106, for example, and appropriately setting a respective selector or indicator 808 on the checklist screen 800 to indicate that the identified individual(s) is present. According to some embodiments, the application may display a confirmation request and accept/reject buttons to the evacuation facilitator for the voices that are matched, and set a respective indicator 808 accordingly.

Some embodiments use textual messages to determine the evacuation status of the individuals listed under the name heading 812. According to such embodiments, individuals may install an individual version of the application on their personal devices ahead of time. In such embodiments, the individual version of the application, as well as the evacuation facilitator's version, includes chatroom or texting functionality. During an evacuation event, an individual may activate the individual version of the application on their mobile device, or it may be activated automatically when a facilitator activates an evacuation as discussed with respect to FIGS. 5 and 6. The individual may access a virtual chatroom particular to the emergency event, via the application. In the chatroom, they may communicate their evacuation status to the evacuation facilitator. The evacuation facilitator may view the statuses (and communicate with the individuals) in the chatroom through their mobile device 100, and may set a respective selector or indicator 808 on the checklist screen 800 based on the provided information.

Some embodiments include multiple forms of evacuation status determination techniques. For example, some embodiments may include evacuation status determination functionality based on any, or any selection of, evacuation facilitator attestation, voice recognition, facial recognition, and device proximity. For embodiments with multiple evacuation status determination functionalities, a single determination by any of the available techniques may be sufficient to account for the presence of an individual evacuee.

Once the mobile device 100 sets one or more evacuation status using selector(s) or indicator(s) 808, the mobile device 100 may save the data to the evacuation status database 108. In various embodiments, the evacuation facilitator may activate a "save" button 806 to do so, while in other embodiments, the mobile device 100 may save automatically, for example, periodically (e.g., every 3 seconds, substantially in real time, etc.) or whenever an indicator 808 changes. Saving the data causes the application to upload the evacuation status data to the evacuation status database 108 using the wireless communication channel of the mobile device 100.

Also depicted in the checklist screen 800 are summary totals concerning the evacuation; in this example, directly above the "save" button 806. Thus, the application displays, in real time, the total number of individuals that the evacuation facilitator is charged with accounting for, the number whose status based on records at the token scan database 104 indicates that they have evacuated and are present outside the location (e.g., the number that are "checked in" as shown in FIG. 8), and the number whose status based on records at token scan database 104 indicates that they are not subject to the evacuation (e.g., the number that are "badged out"). The application also displays, in real time, the number of individuals subject to the evacuation that have not yet been accounted for (e.g., the number that are "not present").

Figure 10:
FIG. 10 depicts a subordinate manager checklist screen of an evacuation tracking application executing on a mobile device according to various embodiments.

Note that, in the example shown in the checklist screen 800, the evacuation facilitator may be a first-level manager, as the screenshot only lists direct reports. FIGS. 9 and 10 illustrate example views for second-level managers.

FIG. 9 depicts an example of a rollup view checklist screen 900 of an evacuation tracking application executing on a mobile device 100 according to various embodiments. The rollup view checklist screen 900 shown may be for a second-level manager, because, in addition to the direct reports that the evacuation facilitator is charged with accounting for, the application displays total counts 902 for the entire evacuated location, which include numbers for both the evacuation facilitator's direct reports, and the direct reports of the subordinate first-level managers under the logged in evacuation facilitator. Thus, while the logged in evacuation facilitator has eight direct reports in the example shown, there are 43 individuals total that the evacuation facilitator may track using the application. Once the checklist data from a subordinate first-level manager is saved, that information becomes available for retrieval from the evacuation status database 108 for downloading and viewing by any qualified evacuation facilitator. In various embodiments, the mobile device 100 may retrieve and refresh from the evacuation status database 108 periodically at short intervals, such as once per second.

Note that the rollup view checklist screen 900 of FIG. 9 shows a view from the perspective of the evacuation facilitator that is logged in. That is, the selected view is that of the logged in evacuation facilitator. However, the evacuation facilitator may select the name of any subordinate evacuation facilitator using the selection mechanism or interface 804, according to some embodiments. FIG. 10 shows an example of a screen where the logged in evacuation facilitator is different from the evacuation facilitator selected by the selection mechanism 804.

FIG. 10 depicts an example of a subordinate manager checklist screen 1000 of an evacuation tracking application executing on a mobile device 100 according to various embodiments. The subordinate manager checklist screen 1000 illustrates an evacuation facilitator view for a facilitator that is different from the evacuation facilitator that is logged in to the application. Thus, the logged in evacuation facilitator, "Leonetta J. Jackson" has selected the name of a subordinate evacuation facilitator, here, "Judy Wong," using the selection mechanism 804, according to some embodiments. The subordinate manager checklist screen 1000 displays the individuals that Ms. Wong is charged with accounting for, along with their status information, as described with respect to the checklist screen 800 of FIG. 8. Note that saving the Wong checklist data to the evacuation status database 108, e.g., when Ms. Wong uses the save button 806, enables Ms. Jackson to view Ms. Wong's results from the evacuation status database 108.

Figure 11:
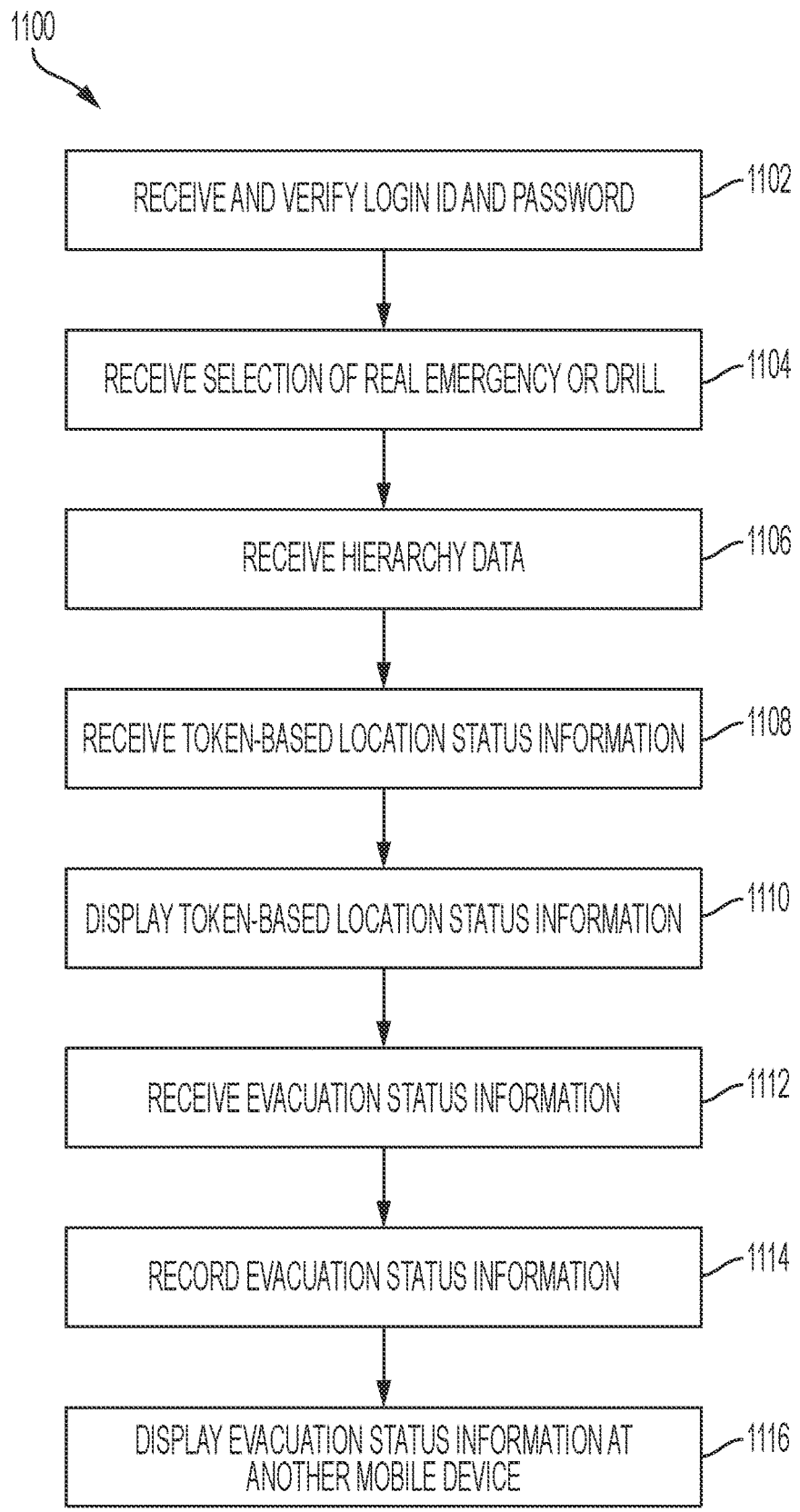
FIG. 11 is a flowchart of a method of evacuation tracking according to various embodiments.

FIG. 11 is a flowchart 1100 of a method of evacuation tracking according to various embodiments. Method 1100 may be implemented in part by an application executing on a mobile device of an evacuation facilitator, e.g., mobile device 100 of FIG. 1.

At block 1102, an executing application installed on a mobile device of an evacuation facilitator receives a login identification and password from the evacuation facilitator, e.g., via a login screen such as that shown and described in reference to FIG. 4. To determine whether the login is successful, the application may forward the identification and the password to a location hierarchy database for comparison to stored records. If the data matches, then the login is successful, and the process may proceed; otherwise, the application may display an error message and request that the evacuation facilitator log in again. The application may lock out the evacuation facilitator after a set number of incorrect login attempts (e.g., five).

At block 1104, the application receives a selection from among choices that include at least a real emergency and emergency simulation. The selection may be received via an option screen such as that shown and described above in reference to FIG. 6.

At block 1106, the application receives hierarchy data, e.g., from the location hierarch database 106. The hierarchy data may be in the form of a connected directed acyclic graph, stored as a computer readable data structure. Each node may represent an individual, and the direction of the edges may indicate subordinate/supervisory roles. The application may obtain a portion of the graph that lies below the node representing the evacuation facilitator that logged in at block 1102. (Note that "below" is intended to refer to the subordinates of the logged in evacuation facilitator; that is, the tree may be considered to be an inverted tree, with the root at the top and the terminal nodes, representing individuals with no direct reports, at the bottom.) Alternately, the application may obtain a copy of the complete tree. The location hierarchy database 106 may use tree traversal techniques to locate the node corresponding to the logged in evacuation facilitator, such as depth-first, or breadth-first traversals. At the application, the tree portion may be traversed using such techniques to extract information regarding the individuals and their relationships and represent them correctly in the application.

At block 1108, the application receives physical token based location status information, e.g., from the token scan database 104. The physical token based location status information indicates whether each subordinate to the logged in evacuation facilitator (including subordinates of subordinate managers) is present or absent from the location as determined from physical token scans. The application may obtain the information by conveying a list of individuals to the token scan database 104 and requesting their records, where the list is derived from the hierarchy data obtained per block 1106. Alternately, the application may obtain a complete set of records from the token scan database 104.

At block 1110, the application displays a physical presence status at the location for each subordinate to the logged in evacuation facilitator (including subordinates of subordinate managers). The displays may be based on the physical token based location status information obtained per block 1108. The display may be as shown and described in reference to FIGS. 8, 9, and 10, with notations of, e.g., "in" or "out", attributed to each such subordinate under the heading "badge status", for example.

At block 1112, the application receives evacuation status information regarding each subordinate at issue. The evacuation status information may be received according to any of the various techniques shown and described above in reference to FIG. 8. Thus, the evacuation status information may include any, or any combination, of voiceprint data, facial image data, chatroom data, evacuation facilitator attestation, and electronic (e.g., radio frequency) proximity information.

At block 1114, the application records the evacuation status information, e.g., by storing it in the remote evacuation status database 108. In various embodiments, the application may do so upon the evacuation facilitator activating a "save" button, e.g., as shown and described above in reference to FIG. 8.

At block 1116, a copy of the application executing on the mobile device of a second evacuation facilitator, different from the evacuation facilitator that logged in per block 1102, displays at least the evacuation status information for each of the subordinates who is a subordinate to the second evacuation facilitator. This may be accomplished by the first evacuation facilitator's mobile device 100 saving their evacuation status information, and the second evacuation facilitator viewing a checklist screen of the application. The second evacuation facilitator may be subordinate or supervisory to the first evacuation facilitator. In either case, the displayed individuals correspond to the subordinates to the second evacuation facilitator who are also subordinates to the first evacuation facilitator.

Note that the evacuation status information stored per block 1114 may be merged with evacuation status existing information for the same evacuation event, e.g., at the remote evacuation status database 108. In the event of data conflicts, the most recent data may be considered definitive according to various embodiments. Thus, the remote evacuation status database 108 may store a running definitive overview of the evacuation status. Further, the remote evacuation status database 108 may store a record of each uploaded status information, e.g., in chronological order. This information may be retrieved, e.g., as described per bock 1116 above, at any time prior to the evacuation status information being cleared. Alternately, or in addition, the information may be retrieved using a different technique, e.g., direct database access. Note that the stored evacuation status information allows for auditing the evacuation event actions. That is, the stored evacuation status information may constitute an audit trail of all evacuation history information. Every evacuation detail can be viewed by the management, for example.

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer implemented method of tracking an evacuation of a location in an environment that utilizes physical tokens to prove physical presence at the location, the method comprising:
   receiving physical token reading information for at least one of a plurality of individuals, wherein the physical token reading information is based on at least one electronic reading of at least one of the physical tokens at the location;
   determining, based on the physical token reading information, a physical presence status at the location for the at least one of the plurality of individuals;
   receiving, by an application executing on a mobile device, evacuation status information for at least one of the plurality of individuals that has a physical presence status that indicates a presence at the location; and
   displaying, based on the receiving the evacuation status information, an evacuation status of the at least one of the plurality of individuals that has a physical presence status that indicates a presence at the location.

2. The method of claim 1, further comprising identifying the plurality of individuals based on electronically stored hierarchy information, wherein the electronically stored hierarchy information comprises an identification of an operator of the mobile device.

3. The method of claim 1, wherein the receiving evacuation status information comprises receiving electronic proximity information of an electronic device of the at least one of the plurality of individuals that has a physical presence status that indicates a presence at the location.

4. The method of claim 1, wherein the receiving evacuation status information comprises capturing an image of the at least one of the plurality of individuals that has a physical presence status that indicates a presence at the location.

5. The method of claim 1, wherein the receiving evacuation status information comprises recording a voiceprint of the at least one of the plurality of individuals that has a physical presence status that indicates a presence at the location.

6. The method of claim 1, wherein the receiving evacuation status information comprises receiving a textual message from the at least one of the plurality of individuals that has a physical presence status that indicates a presence at the location.

7. The method of claim 1, wherein the receiving evacuation status information comprises receiving data from an operator of the mobile device.

8. The method of claim 1, wherein the at least one electronic reading of at least one of the physical tokens comprises an RFID reading.

9. The method of claim 1, further comprising receiving, by the application executing on the mobile device, an indication that the evacuation is a drill.

10. The method of claim 1, further comprising sending, by the application executing on the mobile device, the evacuation status information to a remote computer.

11. A non-transitory computer readable medium comprising instructions that, when executed by at least one electronic processor, configure the at least one electronic processor to track an evacuation of a location, in an environment that utilizes physical tokens to prove physical presence at the location, by performing actions comprising:
receiving physical token reading information for at least one of a plurality of individuals, wherein the physical token reading information is based on at least one electronic reading of at least one of the physical tokens at the location;
determining, based on the physical token reading information, a physical presence status at the location for the at least one of the plurality of individuals;
receiving, by an application executing on a mobile device, evacuation status information for at least one of the plurality of individuals that has a physical presence status that indicates a presence at the location; and
displaying, based on the receiving the evacuation status information, an evacuation status of the at least one of the plurality of individuals that has a physical presence status that indicates a presence at the location.

12. The non-transitory computer readable medium of claim 11, wherein the actions further comprise identifying the plurality of individuals based on electronically stored hierarchy information, wherein the electronically stored hierarchy information comprises an identification of an operator of the mobile device.

13. The non-transitory computer readable medium of claim 11, wherein the receiving evacuation status information comprises receiving electronic proximity information of an electronic device of the at least one of the plurality of individuals that has a physical presence status that indicates a presence at the location.

14. The non-transitory computer readable medium of claim 11, wherein the receiving evacuation status information comprises capturing an image of the at least one of the plurality of individuals that has a physical presence status that indicates a presence at the location.

15. The non-transitory computer readable medium of claim 11, wherein the receiving evacuation status information comprises recording a voiceprint of the at least one of the plurality of individuals that has a physical presence status that indicates a presence at the location.

16. The non-transitory computer readable medium of claim 11, wherein the receiving evacuation status information comprises receiving a textual message from the at least one of the plurality of individuals that has a physical presence status that indicates a presence at the location.

17. The non-transitory computer readable medium of claim 11, wherein the receiving evacuation status information comprises receiving data from an operator of the mobile device.

18. The non-transitory computer readable medium of claim 11, wherein the at least one electronic reading of at least one of the physical tokens comprises an RFID reading.

19. The non-transitory computer readable medium of claim 11, wherein the actions further comprise receiving, by the application executing on the mobile device, an indication that the evacuation is a drill.

20. The non-transitory computer readable medium of claim 11, wherein the actions further comprise sending, by the application executing on the mobile device, the evacuation status information to a remote computer.

* * * * *